United States Patent [19]

Castle et al.

[11] Patent Number: 4,532,321

[45] Date of Patent: Jul. 30, 1985

[54] MICROCRYSTALLINE CHITIN AND METHOD OF MANUFACTURE

[75] Inventors: John E. Castle; Jeffrey R. Deschamps, both of Lewes, Del.

[73] Assignee: University of Delaware, Newark, Del.

[21] Appl. No.: 387,991

[22] Filed: Jun. 14, 1982

[51] Int. Cl.³ .............................................. C08B 37/08
[52] U.S. Cl. ...................................................... 536/20
[58] Field of Search ......................................... 536/20

[56] References Cited

U.S. PATENT DOCUMENTS

| | | | |
|---|---|---|---|
| 2,040,880 | 5/1936 | Rigby | 536/20 |
| 2,842,049 | 7/1958 | Delangre | 536/20 |
| 3,847,897 | 11/1974 | Dunn et al. | 536/20 |
| 4,195,175 | 3/1980 | Peniston | 536/20 |

FOREIGN PATENT DOCUMENTS

| | | | |
|---|---|---|---|
| 904329 | 11/1945 | France | 536/20 |
| 5152705 | 11/1980 | Japan | 536/20 |

*Primary Examiner*—Ethel G. Love

[57] ABSTRACT

A free amino microcrystalline chitin preferably in solid form is obtained. The process may involve the following steps of (1) treating particulate chitin at elevated temperature with phosphoric acid diluted with a lower aliphatic alcohol, (2) treating the resulting chitin with an alkali, (3) washing the chitin to remove the alkali from the chitin emulsion, (4) subjecting the chitin during at least one of the preceding steps to high speed shearing action to convert the processed chitin to the microcrystalline form, and (5) subjecting the resulting microcrystalline chitin emulsion from step 3 to the cycle of freezing and thawing, thereby separating the chitin as a solid from the liquid of the emulsion.

5 Claims, No Drawings

MICROCRYSTALLINE CHITIN AND METHOD OF MANUFACTURE

The Government of the United States of America has rights in this invention pursuant to National Sea Grant Project NA80AA-D00106 awarded by the U.S. Department of Commerce.

This invention relates to microcrystalline chitin and to a method of manufacture of solid microcrystalline chitin.

PRIOR ART

Dunn and Farr in U.S. Pat. No. 3,847,897 describe a method of preparing an aqueous stable thixotropic dispersion of microcrystalline chitin. No mention is made of the recovery of the chitin from the suspension. The process used was controlled mineral acid hydrolysis of purified ground chitin followed by high speed shear forces to obtain colloidal like particles in suspension. The water dispersion is so stable that three freeze-thaw cycles produced only a 2.5% syneresis.

Austin and Brine in U.S. Pat. No. 4,286,087 produced a friable, dispersible microcrystalline chitin powder by hydrolyzing particulate chitin in phosphoric acid and a lower aliphatic alcohol, dispersing the hydrolyzed chitin in water and subjecting it to high speed shearing forces until a colloidal dispersion is obtained and removing the water from the dispersion by drying. The microcrystalline chitin obtained is further characterized as having a small residual phosphorus content present as a phosphate in the polymer molecule.

Laboratory tests show that the microcrystalline chitins of Austin and Brine are actually phosphate salts. The salts are stable compositions, and it has proved impossible to wash out the phosphate by repeated dispersion in water followed by centrifugation. One advantage of these salts is their ready dispersibility in water and the freeze-thaw stability of their dispersions. Therefore, it must be concluded that Dunn and Farr also produce salts of chitin as they state that their dispersions ore freeze-thaw stable.

It is an object of this invention to provide a microcrystalline chitin that salt free, e.g., a free amino microcrystalline chitin and a process of making same. It is a further object to provide free amino microcrystalline chitin in solid form.

SUMMARY OF INVENTION

It has been found that a free amino microcrystalline chitin can be prepared by subjecting a salt of chitin such as prepared by the prior art referred to above to the action of a water-soluble alkaline material, preferably sodium hydroxide, in aqueous solutions following by washing in water until the pH is essentially neutral, i.e., 7.0 to 8.0. This treatment can be carried out either on the chitin before it is subjected to high speed shear forces or after it has been subjected to such forces. The water-soluble alkaline material includes sodium carbonate or bicarbonate as well as sodium hydroxide.

It has also been found that the free amino microcrystalline chitin can be recovered from its aqueous dispersion by freezing the dispersion merely one time and separating the solid from the thawed mass by filtering, centrifuging or settling and decanting.

The following is a generalized formula for free amino (microcrystalline) chitin. Ring hydrogens are omitted for clarity.

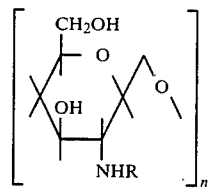

In the above structural formula, the "R" substituents on a majority of the glucosamine units represent acetyl groups

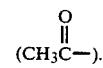

On the remainder, "R" represents hydrogen, corresponding to free amino groups ($-NH_2$). Like most alicyclic amino groups, these are basic in nature. The molecular weight of the polymer can be in the range from 450,000 down to about 5000 as described by Austin and Brine. The "n" in the above formula can thus range from 30 to about 3300.

The following examples illustrate the best modes contemplated for carrying out the process of this invention.

EXAMPLE 1

To 1.25 liters of 2-propanol and 475 ml of 85% phosphoric acid was added 150 g of commercial purified chitin from Tanner (snow) carb shells. The suspension was stirred mechanically heated to the boiling point (approximately 90° C.) and held at that point for 1.5 hr. One liter of tap water was added and the suspension allowed to cool for approximately 1 hr. The mixture was then centrifuged in four portions at 2000 rpm for 15 min. and the supernatant liquid (pH=1) was discarded. The residual solids were combined into two portions and each was resuspended in 500 ml of 2% aqueous sodium hydroxide (pH=11.7). The suspensions were centrifuged as above and the supernatant liquid (pH=2.4–2.8) discarded. The suspension in aqueous alkali and the centrifugation were repeated and the supernatant liquid (pH=11.4–11.7) again discarded.

Several resuspensions in water followed by centrifugations were conducted to remove excess alkali from the chitin. In all, five such washings were run with 500 ml of tap water for each of the two portions of solid product, and two washings were conducted with deionized water (pH=8). The alkalinity dropped from 11.5–11.7 to 7.15–8.0 as the washing proceeded.

A portion (about 100 ml) of the wet cake of free amino chitin was placed in a high-speed "Blendor" and portions of deionized water were added until the Blendor could be run without cavitating. A total of 250 ml of water was required, and the Blendor was finally run at high speed for 1.5 min. to effect shearing and produce a thick, smooth emulsion of free amino microcrystalline chitin resembling mayonnaise.

A 100-ml sample of this emulsion was placed in a covered container and frozen overnight at −20° C. When the sample was allowed to thaw at ambient temperature the next day, the emulsion had broken, the white solid had settled, and the system filtered rapidly on a Buchner funnel under vacuum without clogging the filter paper. The white, granular free amino microcrystalline chitin was dried in a vacuum oven at 35° C. and then ground to pass a 40-mesh screen in a Wiley mill.

EXAMPLE 2

The procedure of the above example was repeated with 150 g of chitin, except that the alkali treatment was conducted with 1% aqueous sodium hydroxide. Three suspensions in alkali followed by centrifugations were required before the pH of the supernatant rose from the acid side to 11.64–11.65. A total of seven resuspensions in deionized water and centrifugations were required before all excess alkali was removed and the pH dropped to 7.2–7.25.

The wet cake of free amino chitin was sheared in two batches in a Blendor to produce microcrystalline product. Each portion required 600 ml of deionized water before the product could be sheared without cavitation. Finally, each batch was run at a combination of low and high speeds for six to seven minutes and the temperature rose spontaneously to about 50° C.

The entire product, comprising a white, creamy suspension, was frozen for two days at −20° C. The frozen material was thawed by placing the containers in warm tap water, and the product was observed to be well coagulated and settled. It filtered rapidly on a Buchner funnel under vacuum and was dried in a vacuum oven at 35° C. After grinding in a Wiley mill to pass a 40-mesh screen, the white, granular product weighed 137.7 g, representing a 91.8% yield of free amino microcrystalline chitin.

EXAMPLE 3

Approximately 5 g of dry, solid microcrystalline chitin prepared according to the procedure of Austin and Brine (U.S. Pat. No. 4,286,087) and containing about 0.7% phosphorus was suspended in 100 ml of 1% aqueous sodium hydroxide solution. The slurry was stirred at room temperature and samples were removed at intervals of 30 min., 60 min. and 24 hr. The solids in the treated dispersion samples were collected on a filter and washed with distilled water until the washing were neutral. The solids were then washed twice with acetone, air dried and analyzed for phosphorous content with the following results:

Original material: 0.76% P
30-min. sample: 0.03
60-min. sample: 0.00
24-hr. sample: 0.00

The 60-min. sample and the 24-hr. sample were free amino microcrystalline chitin.

The time of the alkaline treatment of the salt of the chitin is immaterial. The treatment can be carried out at room temperature. Washing with deionized water is not essential. Washing need only be continued after the alkaline treatment until the water becomes substantially neutral.

Any form of chitin can be employed as an initial source in the practice of this invention, but in the interest of achieving optimum control over the process, it is preferred to employ the commonly available chitins of commerce from which such impurities as calcium carbonate and most of the protein have been removed.

The free amino microcrystalline chitin is a more pure form of microcrystalline chitin and is hence of importance in pharmaceutical and dietary applications. Since it now contains basic free amino groups, it is capable of neutralizing acids and therefore has antiacid properties.

While particular examples of the present invention have been shown and described, it is apparent that changes and modifications may be made herein without departing from the invention in its broadest aspects. The aim of the appended claims, therefore, is to cover all such changes and modifications as fall within the true spirit and scope of the invention.

We claim:

1. A process for preparing free amino microcrystalline chitin, which comprises the steps of:
   (a) Suspending at least once a partially acid-hydrolyzed particulate chitin acid salt of molecular weight of about 5,000 to about 450,000 in a water solution of an alkaline material in an amount sufficient that the dispersion on last contact is alkaline, whereby to convert the deacetylated amino acid salt groups to free amino groups;
   (b) Washing said particulate at least once;
   (c) Shearing the washed product in liquid suspension until a smooth emulsion is formed;
   (d) Freezing said emulsion and thereafter thawing, whereby to precipitate said free amino microcrystalline chitin; and
   (e) Recovering said free amino microcrystalline chitin.

2. The process of claim 1 wherein the alkaline material is selected from the group consisting of sodium hydroxide, sodium carbonate, and sodium bicarbonate.

3. The process of claim 1 wherein the alkaline material is sodium hydroxide and the dispersion on last contact has a pH of at least about 10.

4. The process of claim 1 wherein the particulate is washed with water whereby to remove water soluble material.

5. The process of claim 1 wherein the washed product is sheared in water suspension.

* * * * *